United States Patent [19]

Muzzarelli

[11] Patent Number: 4,907,672
[45] Date of Patent: Mar. 13, 1990

[54] TRANSMISSION FOR A FOUR-WHEEL DRIVE MOTOR VEHICLE

[75] Inventor: Marco F. Muzzarelli, Florence, Italy

[73] Assignee: I.De.A. S.p.A. Institute Of Development In Automotive Engineering, Italy

[21] Appl. No.: 165,784

[22] Filed: Mar. 9, 1988

[30] Foreign Application Priority Data

Mar. 10, 1987 [IT] Italy ............................... 67174 A/87

[51] Int. Cl.$^4$ ............................................. B60K 17/34
[52] U.S. Cl. ................................... 180/233; 180/197; 180/247; 180/249; 475/221; 475/227
[58] Field of Search ............... 180/197, 233, 247, 248, 180/249; 74/694, 701, 715

[56] References Cited

U.S. PATENT DOCUMENTS

| 4,476,953 | 10/1984 | Hiraiwa | 180/249 |
| 4,495,835 | 1/1985 | Gleasman | 74/715 |

FOREIGN PATENT DOCUMENTS

| 254688 | 1/1988 | European Pat. Off. | 180/233 |
| 3428865C1 | 9/1985 | Fed. Rep. of Germany. | |
| 2497735 | 7/1982 | France. | |
| 81226 | 5/1984 | Japan | 180/233 |
| 81227 | 5/1984 | Japan | 180/233 |
| 804775 | 11/1958 | United Kingdom. | |

*Primary Examiner*—Mitchell J. Hill
*Attorney, Agent, or Firm*—Klauber & Jackson

[57] ABSTRACT

The transmission comprises a first differential device which connects the drive shaft with a front shaft to transmit drive to the front wheels and to a rear shaft to transmit drive to the rear wheels a second differential device which connects the front shaft to the half-shaft of the front wheels and a third differential device which connects the rear shaft to the half-shafts of the rear wheels; the differential devices are of the limited slip type, that is to say in which the drive train which connects the two worm gears of the differential devices includes at least one pair of gear wheels having low transmission efficiency, and preferably the differential devices are of the torsen type.

6 Claims, 3 Drawing Sheets

TRANSMISSION FOR A FOUR-WHEEL DRIVE MOTOR VEHICLE

BACKGROUND OF THE INVENTION

As is known, in the transmission between the gear box and the wheels of a four wheel drive motor vehicle there is normally fitted an epicyclic mechanism which acts to transmit the drive from the engine shaft to a front shaft which drives the front wheels and to a rear shaft which drives the rear wheels; the transmission further includes a rear differential and a front differential the first of which connects the said rear shaft with the rear half-shafts while that at the front connects the front half with the front half-shafts.

The epicyclic mechanism serves to divide the torque between the front shaft and the rear shaft in a predetermined torque ratio when the vehicle is in normal operating conditions travelling forwards in a straight line and allows each of the front and rear shafts to assume the angular velocity imposed on them by the rolling conditions of the wheels of the motor vehicle.

In a transmission of this type, whenever the wheels of the front or rear axles reach the slip threshold condition because of the reduction in adhesion between the wheel and the ground, the torque tends to be transferred only to the slipping wheel which is not able to transmit any tangential force to the ground, whilst at the other wheel of the same axis (which is not slipping) the torque tends to fall to zero; consequently no tangential force able to cause displacement of the motor vehicle is transmitted from the wheels of that axle. The same disadvantage occurs whenever both the front wheels or both the rear wheels reach the slip threshold condition.

For the purpose of eliminating this disadvantage in transmissions of this type there are normally provided suitable locking devices which have the purpose of locking one of the two differentials or the epicyclic mechanism when one of the above-indicated slip threshold conditions is reached; these locking devices normally comprise clutches which are able rigidly to connect two rotary members of the differential or the epicyclic mechanism and are controlled by suitable servo mechanisms actuated, for example, electromagnetically. Activation of these latter is controlled by a suitable electronic central processing unit when the predetermined operating conditions are reached.

Transmissions of this latter type, although they obviate the disadvantages referred to initially, are constructionally very complex and therefore expensive, require maintenance and in many cases are not very reliable.

SUMMARY OF THE INVENTION

The object of the present invention is that of providing a mechanical transmission for a four-wheel drive motor vehicle by means of which it is possible to transmit forces tangential to the ground through the wheels for the displacement of the motor vehicle even when one or more of the wheels themselves reach the slip threshold condition; another object of the invention is that of providing a transmission of this type which will be constructionally simple, of low cost and reliable.

These objects are achieved by means of a transmission for a four-wheel drive motor vehicle including a first differential device between the engine and the wheels, which connects the engine drive shaft to the front shaft to transmit drive to the front wheels, and to a rear shaft to transmit drive to the rear wheels of the motor vehicle, a second differential device which connects the said front shaft to the half-shafts of the front wheels, and a third differential device which connects the said rear shaft to the half-shafts of the rear wheels, characterised by the fact that the said differential devices are of the limited slip type in which in the drive train which connects the two worm gears of the differential device there is at least one pair of gear wheels having low transmission efficiency; conveniently the said differentials are of the TORSEN type, in which each worm gear of the device is constituted by a worm and in which the satellites of the device are constituted by pairs of helical gear wheels and in which one of the helical gear wheels of each pair meshes with a first of the said worms and the other helical gear wheel of the same pair meshes with the second of the said worms, a spur gear being fixed to each helical gear wheel of each pair to couple with a spur gear wheel fixed to the other helical gear wheel of the same pair.

BRIEF DESCRIPTION OF THE DRAWINGS

For a better understanding of the present invention a more detailed description of it will now be given by way of example with reference to the attached drawings, in which.

DETAILED DESCRIPTION OF THE INVENTION

Figure 1:
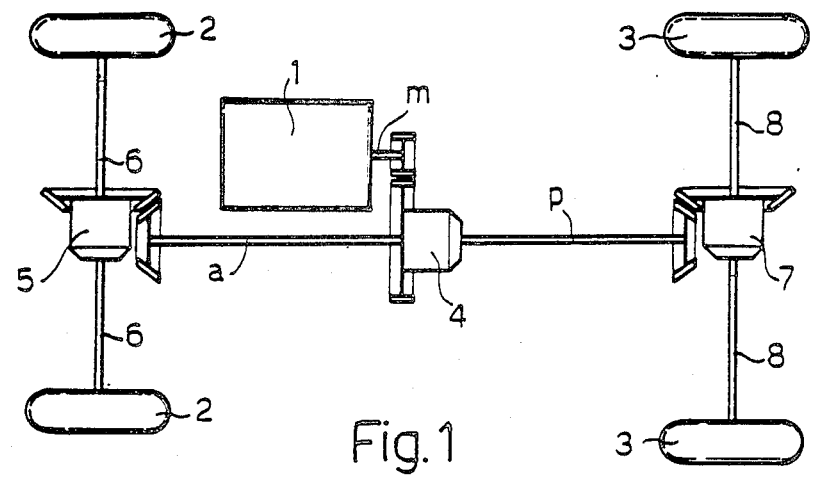
FIG. 1 schematically represents the transmission of the invention.

First, with reference to FIG. 1 the transmission of the invention is operable to transmit drive from an engine 1 to the front wheels 2 and to the rear wheels 3 of the motor vehicle; it includes a first differential device 4 which connects the drive shaft m of the engine 1 to a front shaft a operable to transmit drive to the front wheels 2 and to a rear shaft p operable to transmit drive to the rear wheels, a second differential device 5 which connects the front shaft a to the front half-shafts 6 of the front wheels 2 and a third differential device 7 which connects the front shaft p with the half-shafts 8 of the rear wheels 3. As is clearly seen from FIG. 1, between the shafts m, a, p and the corresponding differentials there are fitted suitable spur gear or bevel gear pairs.

According to the invention each of the three differential devices 4, 5 and 7 is a differential of the limited slip type, that is to say one in which the drive train which connects the two planet gears of the differential device itself has at least one pair of gear wheels having low transmission efficiency. Conveniently the differentials are of the TORSEN type (such as the differentials by numerals 4 and 5 in section in FIG. 3) in which each gear 9 of the device is constituted by a worm and in which the satellites 10 of the device are constituted by helical gear wheels 11. As is known in differentials of this type a helical gear wheel 11 of each pair of satellites 10 meshes with a corresponding worm gear 9 while the other helical gear wheel meshes with the second worm moreover, each helical gear wheel 11 is fixed to a corresponding spur gear 12 for coupling the helical gear wheel 11 with a spur gear fixed to the other helical wheel of the same pair as is clearly seen in FIG. 3. The TORSEN differential device further includes a satellite carrier member 13 the axis of which coincides with that of the planet gear 9 and which is rotatable about the same axis. This this satellite carrier member is provided with bearings having axes lying tangentially of the member itself which are able to support the satellites 10.

Figure 2:
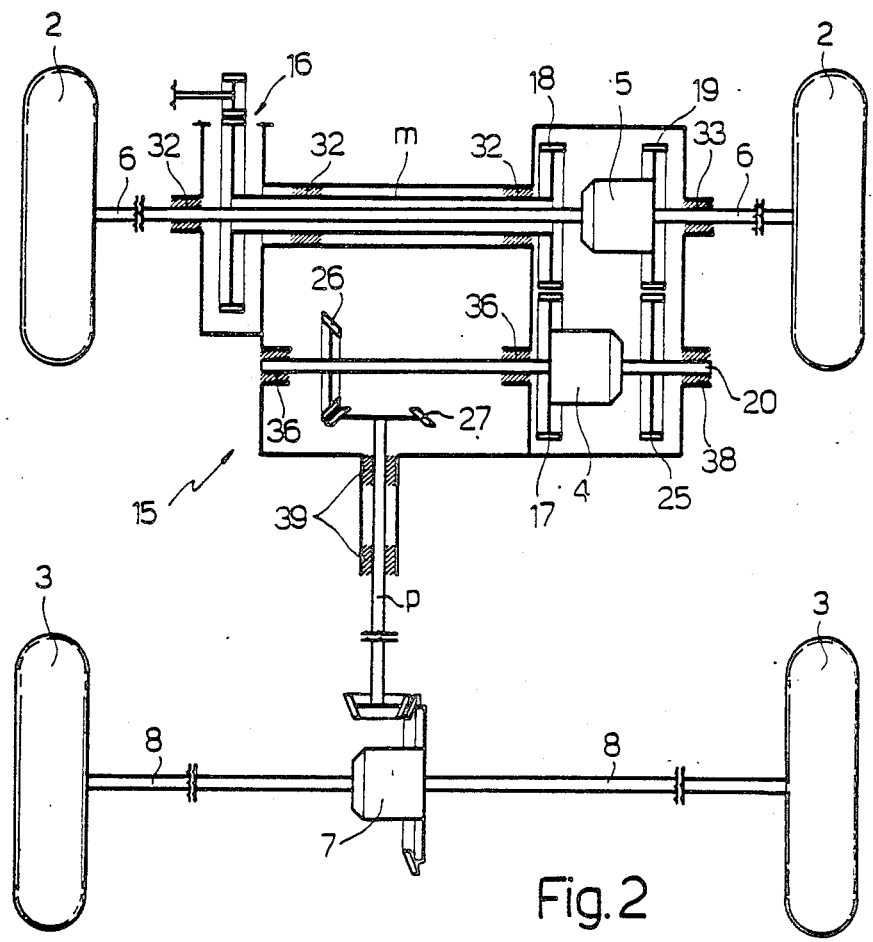
FIG. 2 is another schematic view of the principal mechanical units of the transmission itself.

According to the invention the first and the second differential devices, respectively 4 and 5, form part of a single mechanical unit indicated 15 and shown in FIG. 2; in this unit the differential devices are disposed in such a way that the axes of rotation of the associated satellite carrier members 13 are parallel. The drive shaft m, which is driven by the motor through a suitable pair of spur gears or spur gear wheels 16, is hollow and coaxial with the axis of rotation of the satellite carrier member of the second differential device 5 and is traversed by one of the half-shafts 6 of the front wheels 2. The satellite carrier member of the first differential device 4 is provided with a crown wheel 17 and the drive shaft m is fixed to a spur gear 18 meshing with the said crown wheel in such a way as to transmit drive from the shaft m to the first differential device 4.

Moreover the satellite carrier member of the second differential device 5 is also provided with a crown wheel 19 while one of the planet gear wheels of the differential device 4 is connected to a short shaft 20 fixed to a spur gear 25 meshing with the crown wheel 19 for the purpose of obtaining connection between the first and the second differential devices 4 and 5 respectively.

The other planet gear of the first differential device 4 is fixed to a bevel gear 26 meshing with a corresponding bevel gear 27 fixed to the rear shaft p in such a way as to connect the first differential device 4 with the third differential device 7.

Figure 3:
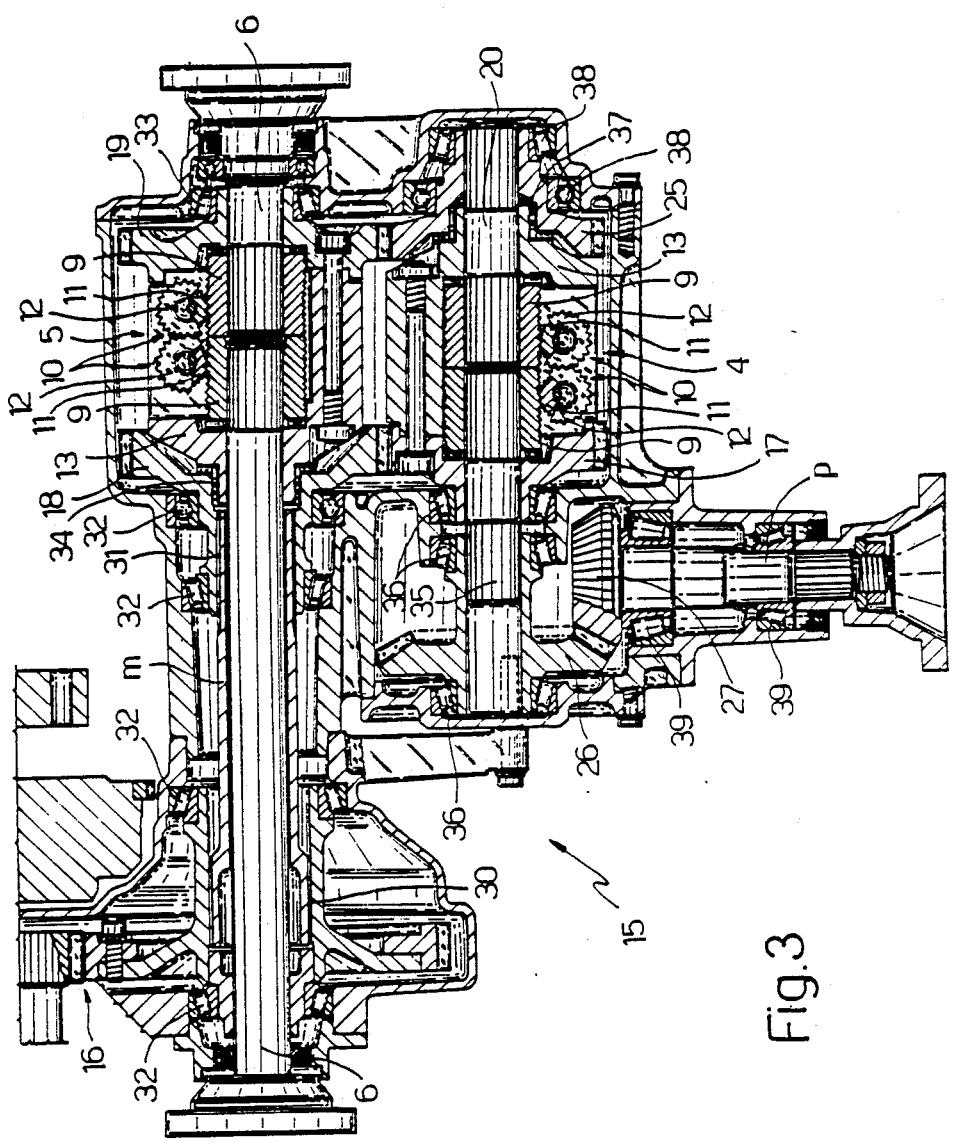
FIG. 3 is a longitudinal section of the principal mechanical unit of the transmission.
Figure 4:
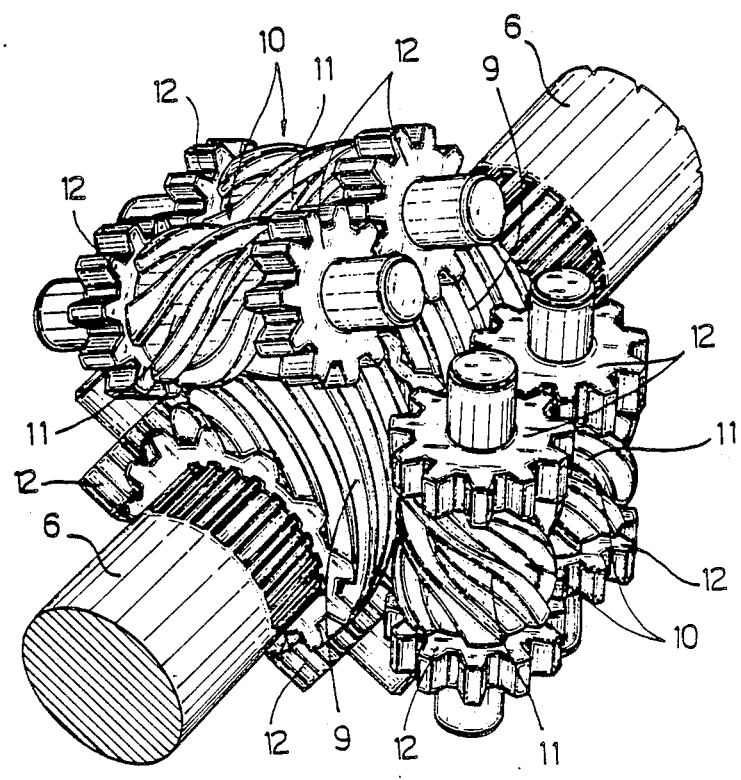
FIG. 4 is a perspective view of the worm gears and drive train of one of the differential devices of the transmission according to the present invention.

In FIG. 3 there has been shown a constructional embodiment of the unit 17 schematically shown in FIG. 2. The corresponding members shown in the two Figures have been indicated with the same reference numerals.

As is seen from FIG. 3, the assembly of one of the gear wheels 16 and of the gear wheel 18 onto the hollow shaft m has been achieved by splined couplings 30 and 31; further, the said shaft is supported, together with this gear wheel, by rolling element bearings 32. Support of the second differential device 5 is achieved by means of the bearing 33 and the ring of rollers 34.

The bevel gear 26 is connected to the first differential device 4 by means of a splined coupling 35, while the support of this gear wheel and of the first differential device 4 is achieved by means of bearings 36 and roller ring 37; support for the short shaft 20 is achieved by means of bearings 38. Finally, support for the first section of the shaft p to which the bevel gear wheel 27 is connected is achieved by means of rolling element bearings 39.

The operation of the transmission described above is as follows.

In normal straight ahead operating conditions of the motor vehicle drive is transmitted from each satellite carrier member 13 (FIG. 3) of the three differentials 4, 5 and 7 to the worm gears 9 of the differentials themselves through the satellites 10 without which there would be rotation of the satellites themselves with respect to the satellite carrier member; when the vehicle moves in a curved path there is relative velocity between the two half-shafts 6 or 8 and between the front shaft a and the rear shaft p, which is allowed by the differentials in each of which there is therefore also a rotation of the satellites 10 on their respective satellite carrier members 13.

If it is now supposed that one of the front wheels 2 or rear wheels 3 reaches the slip threshold condition there is obtained a substantially rigid connection between the two half-shafts through the drive train formed by the worm gears 9 and the satellites 10 in a functional manner which is typical of this type of differential and which is well known. Similarly, if the slip threshold conditions of both the front wheels 2 or of both the rear wheels 3 were to occur, there would be a substantially rigid connection, through the operation of the first differential device 4, between the front shaft a and the rear shaft p and a transfer of drive torque from one to the other of the two shafts.

It is therefore evident that with the transmission of the invention a rigid connection between the two half-shafts 6 or 8 and between the front shaft a and the rear shaft p of the transmission is automatically effected in particular operating conditions, and that therefore the occurrence of conditions in which one or more of the wheels slips completely while the other is stationary is prevented; in such conditions, as is known, any movement of the vehicle is prevented since the whole of the torque is transmitted to the slipping wheel, while no tangential force at all is transmitted from the stationary wheel to the ground.

It is evident that the embodiment of the present invention described above can have modifications and variations introduced thereto without departing from the scope of the invention itself.

In particular, although in the described transmission TORSEN differential devices have been utilized these can be replaced by other equivalent limited slip devices, that is to say devices in which the drive train which connects the two planet gear wheels of the device includes at least one pair of gear wheels having low transmission efficiency.

I claim:

1. A transmission for a four wheel drive motor vehicle, between the engine and the front wheels and rear wheels, each of said front wheels and rear wheels being driven through half-shafts, comprising:
    (a) a first differential device connected to a drive shaft of the engine;
    (b) a rear shaft connected with the first differential device;
    (c) a second differential device which connects the first differential device to half-shafts of the front wheels for transmitting drive to front wheels of the vehicle;
    (d) a third differential device which connects the rear shaft to half-shafts of the rear wheels for transmitting drive to the rear wheels of the vehicle;
    (e) each of said first, second and third differential devices being of a limited slip TORSEN type, each said differential device including:
        (i) two worm gears, and
        (ii) a drive train connecting the two worm gears, said drive train including:
    (A) at least one pair of helical gear wheels, each pair of helical gear wheels including a first helical gear wheel in meshing engagement with one of said worm gears and a second helical gear wheel in meshing engagement with the other of said worm gears, and (B) at least one pair of spur gear wheels, each pair of spur gear wheels including a first spur gear wheel fixed to the first helical gear wheel of a respective pair of helical gear wheels and a second spur gear wheel fixed to the second helical gear wheel of the respective pair of helical gear wheels, the first and second spur gear wheels of each pair of spur gear wheels being in meshing engagement with each other.

2. A transmission according to claim 1, further including a mechanical unit containing said first and second differential devices, said first differential device including a first carrier member for holding said helical gear wheels of the first differential device, said second differential device including a second carrier member for holding said helical gear wheels of the second differential device, each said carrier member having an axis of rotation, and said axes of rotation of said carrier members of said first and second differential devices being parallel to each other.

3. A transmission according to claim 2, wherein said drive shaft is hollow and is coaxially arranged with the axis of rotation of the carrier member of said second differential device, and one of said half-shafts of the front wheels extends through said drive shaft.

4. A transmission according to claim 2, wherein the carrier member of the first differential device includes a crown wheel, and said transmission further includes a first gear wheel fixed to said drive shaft, said first gear wheel being in meshing engagement with said crown wheel.

5. A transmission according to claim 2, wherein the carrier member of the second differential device includes a crown wheel, and said transmission further includes a short shaft and a first gear wheel fixed to the shaft in meshing engagement with said crown wheel, and wherein one of the worm gears of the first differential device is fixed to the short shaft.

6. A transmission according to claim 2, further including a first bevel gear fixed for rotation with one of the worm gears of said first differential device, and a second bevel gear in meshing engagement with the first bevel gear, the second bevel gear being fixed to the rear shaft.

* * * * *

UNITED STATES PATENT AND TRADEMARK OFFICE
CERTIFICATE OF CORRECTION

PATENT NO. : 4,907,672

DATED : March 13, 1990

INVENTOR(S) : Marco Fantini Muzzarelli

It is certified that error appears in the above-identified patent and that said Letters Patent is hereby corrected as shown below:

Claim 1, line 17 (Column 4, line 59), cancel "TORSEN";

Claim 1, last line (Column 5, line 11), cancel the line in its entirety and in place thereof, insert the following:

--other;

(f) a mechanical unit containing said first and second differential devices; and (g) said first differential device including a first carrier member for holding said helical gear wheels of the first differential device, said second differential device including a second carrier member for holding said helical gear wheels of the second differential device, each said carrier member having an axis of rotation, and said axes of rotation of said carrier members of said first and second differential devices being parallel to each other.--

Cancel Claim 2 in its entirety.

Claim 3, line 1, (Column 5, line 23), change "2" to --1--.

Claim 4, line 1, (Column 6, line 4), change "2" to --1--.

UNITED STATES PATENT AND TRADEMARK OFFICE
CERTIFICATE OF CORRECTION

PATENT NO. : 4,907,672

DATED : March 13, 1990

INVENTOR(S) : Marco Fantini Muzzarelli

It is certified that error appears in the above-identified patent and that said Letters Patent is hereby corrected as shown below:

Claim 5, line 1, (Column 6, line 10), change "2" to --1--.

Claim 6, line 1, (Column 6, line 17), change "2" to --1--.

Signed and Sealed this

Fourteenth Day of January, 1992

*Attest:*

HARRY F. MANBECK, JR.

*Attesting Officer*  *Commissioner of Patents and Trademarks*